US006580367B2

(12) United States Patent
Roach

(10) Patent No.: US 6,580,367 B2
(45) Date of Patent: Jun. 17, 2003

(54) VEHICLE INFORMATION DISPATCH SYSTEM

(76) Inventor: John Edward Roach, 1814 S. 16th St., Tacoma, WA (US) 98405

(*) Notice: Subject to any disclaimer, the term of this patent is extended or adjusted under 35 U.S.C. 154(b) by 0 days.

(21) Appl. No.: 09/752,849

(22) Filed: Jan. 2, 2001

(65) Prior Publication Data

US 2002/0084918 A1 Jul. 4, 2002

(51) Int. Cl.[7] .................. B60Q 01/52
(52) U.S. Cl. .................. 340/471; 340/989
(58) Field of Search .................. 340/471, 989, 340/988, 506, 524, 531

(56) References Cited

U.S. PATENT DOCUMENTS

| | | | | |
|---|---|---|---|---|
| 4,596,988 A | | 6/1986 | Wanka | 340/825.49 |
| 5,008,661 A | * | 4/1991 | Raj | 340/10.33 |
| 5,068,656 A | | 11/1991 | Sutherland | 340/989 |
| 5,142,278 A | | 8/1992 | Moallemi et al. | 307/10.1 |
| 5,396,540 A | | 3/1995 | Gooch | 342/357.09 |
| 5,448,220 A | * | 9/1995 | Levy | 340/10.42 |
| 5,539,810 A | | 7/1996 | Kennedy, III et al. | 340/431 |
| 5,640,139 A | * | 6/1997 | Egeberg | 307/10.2 |
| 5,693,985 A | | 12/1997 | Gee et al. | 280/422 |
| 5,719,771 A | * | 2/1998 | Buck et al. | 340/438 |
| 5,826,195 A | | 10/1998 | Westerlage et al. | 455/422 |
| 5,829,782 A | | 11/1998 | Breed et al. | 180/272 |
| 5,917,433 A | * | 6/1999 | Keillor et al. | 340/540 |
| 5,991,615 A | | 11/1999 | Coppinger et al. | 455/405 |
| 6,313,791 B1 | * | 11/2001 | Klanke | 342/357.06 |

* cited by examiner

*Primary Examiner*—Daniel J. Wu
*Assistant Examiner*—Sihong Huang
(74) *Attorney, Agent, or Firm*—Michael I. Kroll

(57) ABSTRACT

A method and system for notifying emergency personnel as to the location and contents of a vehicle. The system includes an information dispatch device positioned within the vehicle for storing and transmitting data related to the vehicle, cargo being carried by the vehicle and instructions on handling emergency situations involving the cargo carried by the vehicle to a Global Positioning Satellite upon detection of an emergency situation and a command control center for receiving a location signal from the Global Positioning Satellite (GPS) including the data transmitted by said information dispatch device and a location signal for the vehicle generated by the Global Positioning Satellite. The command control center is able to contact emergency personnel upon receipt of the location signal and provide a location of the vehicle and information concerning the material carried by the vehicle. The data is preferably provided to the information dispatch device by a data input device. A manual activation button is provided for manually activating the information dispatch device to transmit the data to said GPS. A sensor is provided for detecting an emergency situation such as fire, smoke, turning over of the vehicle and impact on the vehicle and activating said information dispatch device to transmit said data to said GPS.

2 Claims, 6 Drawing Sheets

VEHICLE INFORMATION DISPATCH SYSTEM

BACKGROUND OF THE INVENTION

1. Field of the Invention

The present invention relates generally to an information dispatch systems and, more specifically to a system for communicating location and content specific information from a disabled carrier to a central command center using the Global Positioning Satellite (GPS) System.

2. Description of the Prior Art

Numerous types of communication systems have been provided in the prior art. For example, U.S. Pat. Nos. 5,991,615, 5,829,782, 5,826,195, 5,693,985, 5,539,810, 5,396,540, 5,142,278, and 5,068,656 (all described below) all are illustrative of such prior art. While these devices may be suitable for the particular purpose to which they address, they would not be as suitable for the purposes of the present invention as heretofore described.

U.S. Pat. No. 5,991,615

Inventor: Coppinger

Issued: Nov. 23, 1999

A communication system for transmitting messages includes a mobile private communication system. The mobile private communication system has a mobile terminal disposed in each of a plurality of trucks, the mobile terminal having a transceiver, an electronic control device in communication with the transceiver, and a display in communication with the electronic control device for displaying the messages. A satellite transmits the messages to the mobile terminal, and a satellite dish transmits the messages to the satellite. A satellite hub converts the messages to a satellite transmittable form. An interface is provided, having a local management system for adjusting an account for each of the messages being transmitted to the mobile terminal, and further for ensuring that the account has a sufficient balance prior to transmitting messages to the mobile terminal. The interface also has a voice response device for creating messages, and a telephone interface system for receiving operator input and selecting one of the messages in response to the operator input. A public communication system, including a public telephone system having telephones connected to a telephone network interface, transmits the operator input to the telephone system.

U.S. Pat. No. 5,829,782

Inventor: Breed

Issued: Nov. 3, 1998

This invention is a system to identify and monitor contents and/or parts of the passenger compartment of a motor vehicle, such as an automobile or truck, by processing the signal received from the contents or parts using one or more techniques, including neural networks or other pattern recognition systems, and technologies including ultrasonic and electromagnetic radiation. The received signal may be a reflection of a transmitted signal, the reflection of some natural signal within the vehicle, or may be a signal emitted naturally by the object. Information obtained by the identification and monitoring system is then used to affect the operation of some other system in the vehicle such as the airbag, entertainment system, heating and air conditioning system, or the system to darken portions of the mirrors or windshield, among others.

U.S. Pat. No. 5,826,195

Inventor: Westerlage

Issued: Oct. 20, 1998

A messaging device (16) equipped with a cellular transceiver (38) is attached to a truck trailer (12) or a monitoring station (13) located within a communications network (10). The messaging device (16) generates a data message in response to the occurrence of a reporting event. Upon generation of a data message, the cellular transceiver (38) transmits the data message over the network (10) via voice or data channels. Data messages may be sent over a data channel of the network (10) by altering the mobile identification number (MIN), electronic serial number (ESN), or other identifier of the cellular transceiver (38).

U.S. Pat. No. 5,693,985

Inventor: Gee

Issued: Dec. 2, 1997

A trailer electrical monitor function is implemented into a microprocessor based truck tractor and trailer electrical communication system where a programmable memory device connected to a trailer electronic control device is used by the trailer electronic control unit to store a trailer identification code, the result of which is connected through an interface circuit to the trailer electronic control unit where the result is then transmitted to a tractor electronic control unit and/or to an external programming device. The tractor and trailer electronic control devices control the state of a plurality of switching devices to establish the appropriate electrical connection into and out of a standard seven pin tractor/trailer electrical connector where high speed data communication links are used for control diagnostics.

U.S. Pat. No. 5,539,810

Inventor: Kennedy

Issued: Jul. 23, 1996

A messaging device (16) equipped with a cellular transceiver (38) is attached to a truck trailer (12) located within a communications network (10). The messaging device (16) generates a data message in response to the occurrence of a reporting event. Upon generation of a data message, the cellular transceiver (38) transmits the data message over the network (10) via voice or data channels. The data message is received at an MTSO (20) and then routed to a platform (24), a clearinghouse (22), or the platform (24) through the clearinghouse (22). The data message stored at the platform (24) or the clearinghouse (22) is accessed by a host (26). A data message may be sent over a voice channel of the network (10) subject to a handshake protocol between the messaging device (16) and the platform (24). Data messages may also be sent over a data channel of the network (10) by altering the mobile identification number (MIN) or electronic serial number (ESN) of the cellular transceiver (38). Furthermore, data messages may be sent over a data channel of the network (10) by issuing a feature request with appended data digits.

U.S. Pat. No. 5,396,540

Inventor: Gooch

Issued: Mar. 7, 1995

A telephone call may be made to a carrier, such as a long haul truck, located in an unknown cellular telephone cell in a remote service area. The carrier is provided with a cellular telephone, satellite data communications system and a position signal receiver for a system such as LORAN-C or Global Positioning System (GPS). If the command control center desires to initiate a voice communication with the carrier, the control facility transmits a voice communication request to the carrier via a non-voice data communications satellite. The position signal receiver receives data from the LORAN-C or GPS transmitter indicative of the current geographic location of the carrier and transmits the data to the command control center via the data communications satellite. At the command control center a computer with a data base identifying the geographic extent of relevant cellular telephone cells uses the location of the carrier to identify the cell in which the carrier is presently located. A telephone call is then initiated from the command control center to the carrier via landline and cellular telephone network serving the identified cell. Further, if the operator of the carrier desires to initiate a telephone call, he can send a request via the satellite data link. The command control center can then initiate the call as described above.

U.S. Pat. No. 5,142,278

Inventor: Moallemi

Issued: Aug. 25, 1992

An apparatus and method for providing communication of information between a truck tractor and trailer via existing truck wiring. At least one transmitter is located in each trailer for generating a unique identification signal representative of trailer identification information corresponding to the trailer in which the transmitter is located, modulating the identification signal, and providing the modulated identification on an existing truck power bus coupling the tractor and trailer. A receiver is located in the tractor for receiving each modulated identification signal on the power bus, demodulating each modulated identification signal and providing each demodulated identification signal to a mobile communications terminal located in the tractor for transmission to a central facility. The system may further include the transmission of trailer status or load status information by the transmitter to the receiver in a similar manner as the identification information.

U.S. Pat. No. 5,068,656

Inventor: Sutherland

Nov. 26, 1991

A system and method for monitoring and reporting out-of-route mileage for long haul trucks which includes transmitting route data from a dispatcher to a distant truck where comparisons aboard the truck are made of its current position with predetermined acceptable positions and exception reports are generated and transmitted back to the dispatcher from the truck if the current position is not included in the set of predetermined acceptable positions.

SUMMARY OF THE INVENTION

The present invention relates generally to an information dispatch system and, more specifically to a system for communicating location and content specific information from a disabled carrier to a central command center using the Global Positioning Satellite (GPS) System.

The vehicle information dispatch system is designed to be installed in a vehicle transporting hazardous material. Should there be an accident in which the vehicle is disabled or involved in a hazardous situation such as an accident or fire, a transmitting device is activated to transmit information stored by the system including the type of carrier, the description and amount of hazardous material being carried, and the recommended procedure for safely handling the emergency situation or spill recovery, via the Global Positioning Satellite (GPS) System to a command control center. The command control center is then able to alert and dispatch the necessary and proper form of assistance.

A primary object of the present invention is to provide an information dispatch system that will overcome the shortcomings of prior art devices.

Another object of the present invention is to provide an information dispatch system which is able to transmit information to a command control center regarding the type of carrier/vehicle involved in the accident and the location of the accident via the GPS system.

A further object of the present invention is to provide an information dispatch system which is able to transmit information regarding the description of the hazardous material carried by the disabled carrier.

A yet further object of the present invention is to provide an information dispatch system which is able to transmit information regarding the recommended procedure for safely rendering aid to the disabled carrier carrying the hazardous material.

A still further object of the present invention is to provide an information dispatch system which automatically transmits the pre-programmed information to a central command control center via the GPS system upon detection of a hazardous situation.

An even further object of the present invention is to provide an information dispatch system which is able to provide the location of the vehicle via the GPS satellite system to the command control center thereby aiding the command control center in contacting the necessary emergency personnel at a location closest to the vehicle.

A yet further object of the present invention is to provide an information dispatch system including an activation button for manually activating the transmitter to transmit the pre-programmed information to the command control center.

A further object of the present invention is to provide a information dispatch system which allows the receiving central command control center to notify and dispatch needed rescue, medical personnel, police and fire personnel, and notify the public via radio, TV and the internet.

Another object of the present invention is to provide an information dispatch system that is simple and easy to use.

A still further object of the present invention is to provide an information dispatch system that is economical in cost to manufacture.

Additional objects of the present invention will appear as the description proceeds.

A method and system for notifying emergency personnel as to the location and contents of a vehicle is disclosed by the present invention. The system includes an information dispatch device positioned within the vehicle for storing and transmitting data related to the vehicle, cargo being carried by the vehicle and instructions on handling emergency situations involving the cargo carried by the vehicle to a Global Positioning Satellite upon detection of an emergency situation and a command control center for receiving a location signal from the Global Positioning Satellite (GPS)

including the data transmitted by said information dispatch device and a location signal for the vehicle generated by the Global Positioning Satellite. The command control center is able to contact emergency personnel upon receipt of the location signal and provide a location of the vehicle and information concerning the material carried by the vehicle. The data is preferably provided to the information dispatch device by a data input device. A manual activation button is provided for manually activating the information dispatch device to transmit the data to said GPS. A sensor is provided for detecting an emergency situation such as fire, smoke, turning over the vehicle and impact on the vehicle and activating said information dispatch device to transmit said data to said GPS.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DESCRIPTION OF THE REFERENCED NUMERALS

Figure 1:
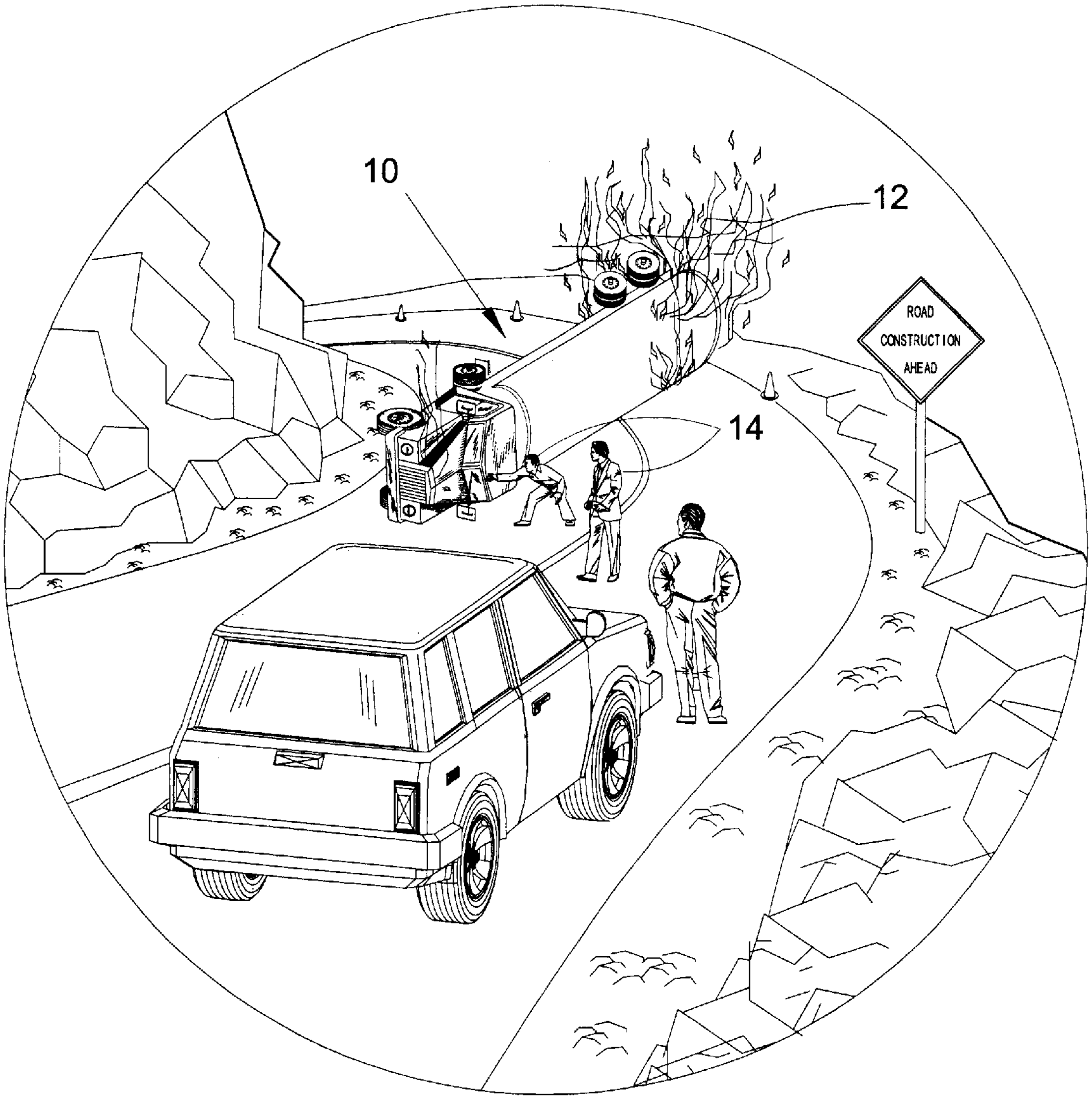
FIG. 1 is a perspective view of a vehicle in an emergency situation awaiting assistance, persons in the surrounding area are unable to determine a safe manner for handling the situation.
Figure 2:
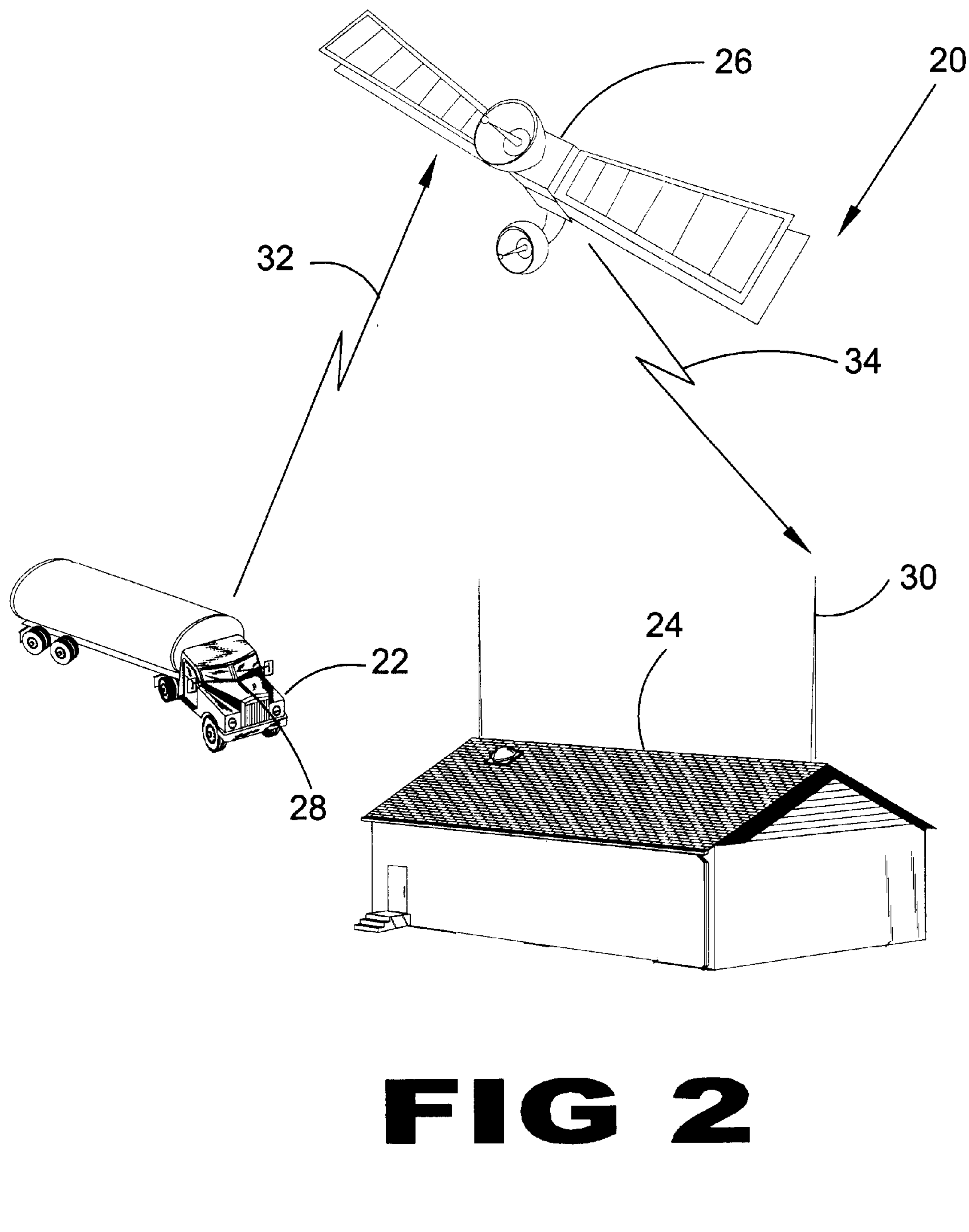
FIG. 2 is a diagrammatic representation of the information dispatch system of the present invention being used to transmit information concerning a vehicle including the vehicle location to a central station via the GPS system.
Figure 3:
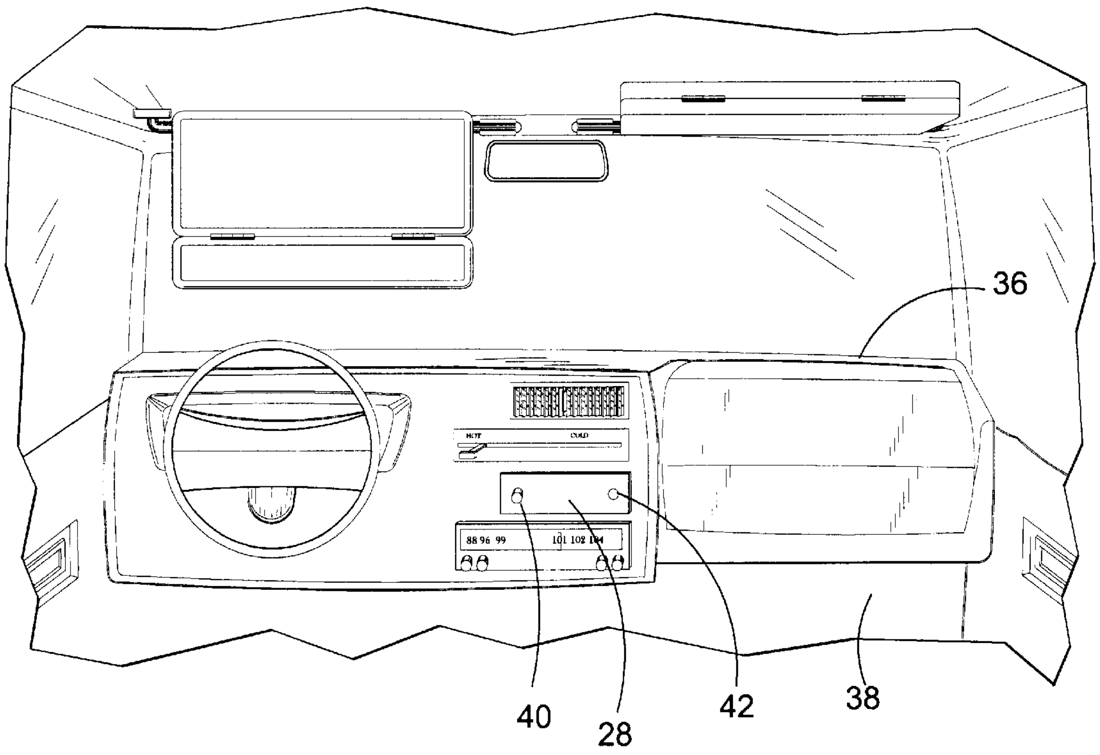
FIG. 3 is a perspective view of the information dispatch system of the present invention positioned within a dashboard of a vehicle.

Turning now descriptively to the drawings, in which similar reference characters denote similar elements throughout the several views, the Figures illustrate the information dispatch system of the present invention. With regard to the reference numerals used, the following numbering is used throughout the various drawing figures.

10 vehicle in an emergency situation
12 flames engulfing the vehicle
14 persons attempting to aid the distressed vehicle
17 arrow indicating signal from information control device to GPS satellite
18 antenna
19 arrow indicating signal transmitted from GPS satellite to satellite link station
20 information dispatch system of the present invention
22 vehicle carrying hazardous material
24 command control center
26 Global Positioning Satellite (GPS)
28 information control device
30 satellite receiver of command control center
32 arrow indicating transmission from information control device to GPS
34 arrow indicating transmission from GPS to command control center
36 dashboard
38 cabin of vehicle
40 activation button
42 data input port
44 data input device
46 connection wire
48 keyboard
50 display
52 antenna
54 processor of information dispatch device
56 power source for information dispatch device
58 memory of information dispatch device
60 emergency sensor
62 transmitter of information dispatch device
64 receiver of command control center
66 control center computer
68 data terminal

DETAILED DESCRIPTION OF THE PREFERRED EMBODIMENT

As can be seen in FIG. 1, accidents occur wherein a vehicle 10 carrying hazardous material may flip and/or be engulfed in flames 12. When such a situation occurs, onlookers 14 are generally unable to aid in handling the situation in a safe manner. This is due to the nature of the situation. Many times such an emergency situation arises, the persons 14 in a position to lend aid are ill equipped to handle the situation. This is due to a lack of information concerning the vehicle 10 and its contents. As the contents of the vehicle 10 may be difficult to determine, any action taken may do more harm than good. It is thus necessary to provide a system for which the contents of a vehicle as well as procedures for handling emergency situations may be readily determined.

Turning now descriptively to the drawings, in which similar reference characters denote similar elements throughout the several views, FIGS. 2 through 5 illustrate the information dispatch system of the present invention indicated generally by the numeral 20.

A diagrammatic view of the information dispatch system 20 of the present invention is illustrated in FIG. 1. As can be seen from this view, the system 20 is able to transmit information regarding a vehicle 22, such as a long haul truck, to a command control center 24 via a Global Positioning Satellite (GPS) 26. Positioned within the vehicle 22 is an information dispatch device 28. The information dispatch device 28 stores information concerning the vehicle 22 such as registration information on the vehicle 22, information concerning the load being hauled by the vehicle 22, information on handling emergency situations concerning the vehicle 22 and procedures for handling the load being hauled thereby. This system 20 is especially useful for vehicles 10 hauling hazardous materials. Normally, when such a vehicle 22 encounters danger such as overturning or catching fire, it is difficult to readily determine the type of hazardous material being carried thereby. This is especially true if the driver is injured or unconscious and unable to communicate with emergency personnel or the vehicle is on fire and smoke produced by the fire prevents the emergency personnel from determining what is being carried by the vehicle 22. Thus, should a vehicle 22 hauling hazardous materials encounter an emergency situation, it is helpful for emergency personnel tending to the emergency know as much information as possible to diffuse the situation with a minimal possibility of injury and damage.

The information dispatch system 20 thus, provides for the immediate transmission of information stored by the information dispatch device 28 to the command control center 24 via the GPS 26 upon detection of an emergency situation or activation of an activation button. The information dispatch device 28 is located within the vehicle 22. Prior to beginning a journey, the information dispatch device 28 is programmed with information concerning the vehicle 22 in which it is positioned. This information includes registration information on the vehicle 22, information concerning the load being hauled by the vehicle 22, information on handling emergency situations concerning the vehicle 22 and procedures for handling the load being hauled thereby. The information dispatch device 28 transmits a signal to the GPS 26 upon detecting an emergency situation. The signal transmitted by the information dispatch device 28 to the GPS 26 is indicated by the arrow labeled with the numeral 32. The GPS 26 determines the location of the vehicle 22 and transmits a location signal along with the data transmitted by the information dispatch device 28 to the command control center 24. The signal transmitted by the GPS 26 to the command control center 24 is indicated by the arrow labeled with the numeral 34. The command control center 24 includes a satellite receiver system 30 for receiving the signal from the GPS 24. The received information is then provided by the command control center 24 to the appropriate emergency personnel so that the situation may be handled quickly and correctly.

Figure 4:
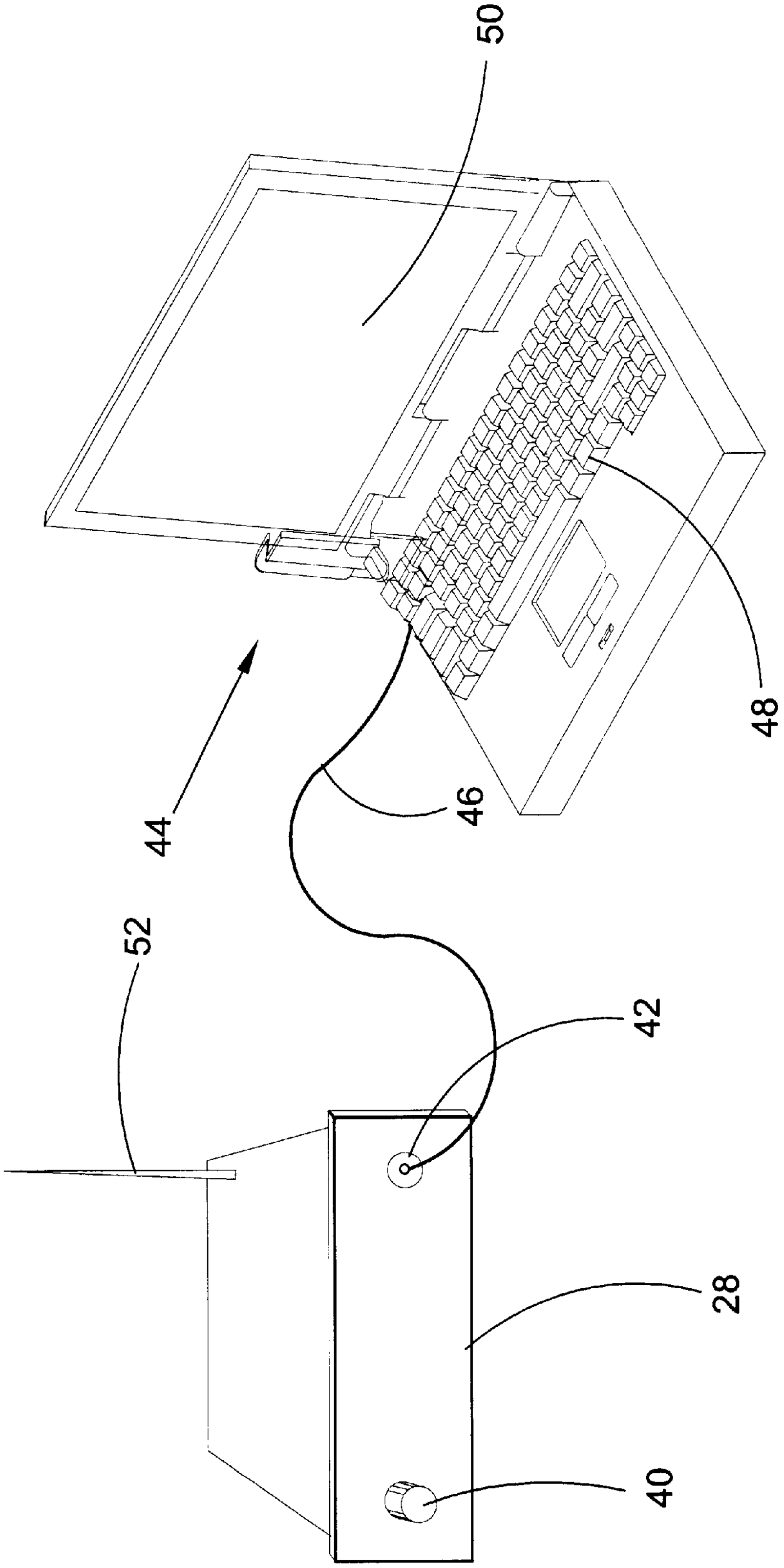
FIG. 4 is a perspective view of the information dispatch system of the present invention connected to a data input device for programming the system with information concerning the vehicle.

A view of the information dispatch device 28 positioned within a dashboard 32 within a cabin 34 of a vehicle. As can be seen from this figure, the information dispatch device 28 is centrally located within the cabin 38 so as to be within the reach of the operator of the vehicle. The information dispatch device 28 includes an activation button 40 for manually activating the information dispatch device 28 to transmit a signal to the GPS 26. The information dispatch device 28 also includes an input port 42 for connection with a data input device 44 such as a computer as illustrated in FIG. 4. The positioning of the information dispatch device 28 allows the operator to easily activate the information dispatch system 20 and thereby provide emergency personnel to aid the operator when the operator determines that an emergency exists. The information dispatch system 20 also includes provisions to automatically activate upon detection of an emergency situation by sensors.

FIG. 4 illustrates the information dispatch device 28 connected to a data input device 44. As can be seen from this figure, the information dispatch device 28 includes a data input port 42 for connection to the data input device 44 via a connection wire 46. The data input device 44 may be a computer 48 including a keypad 50 and a monitor 52 for providing a display to guide the operator when entering data into the information dispatch device 28. The data input device may alternatively be any other type of data input device such as a scanner, a processor, a recording and reproducing device, an audio receiver device able to receive audio input signal for transmission, etc. Upon input of the data by the data input device 44, the data is stored within the information dispatch device 28. When activated, the information dispatch device 28 will transmit the information to a command control center 24 via a GPS 26. The information dispatch device 28 also includes a manually activated button 40 and an antenna 52. The manually activated button 40 allows the operator to activate the information dispatch device to transmit the stored information data and the antenna 52 is provided for transmission of the data.

Figure 5:
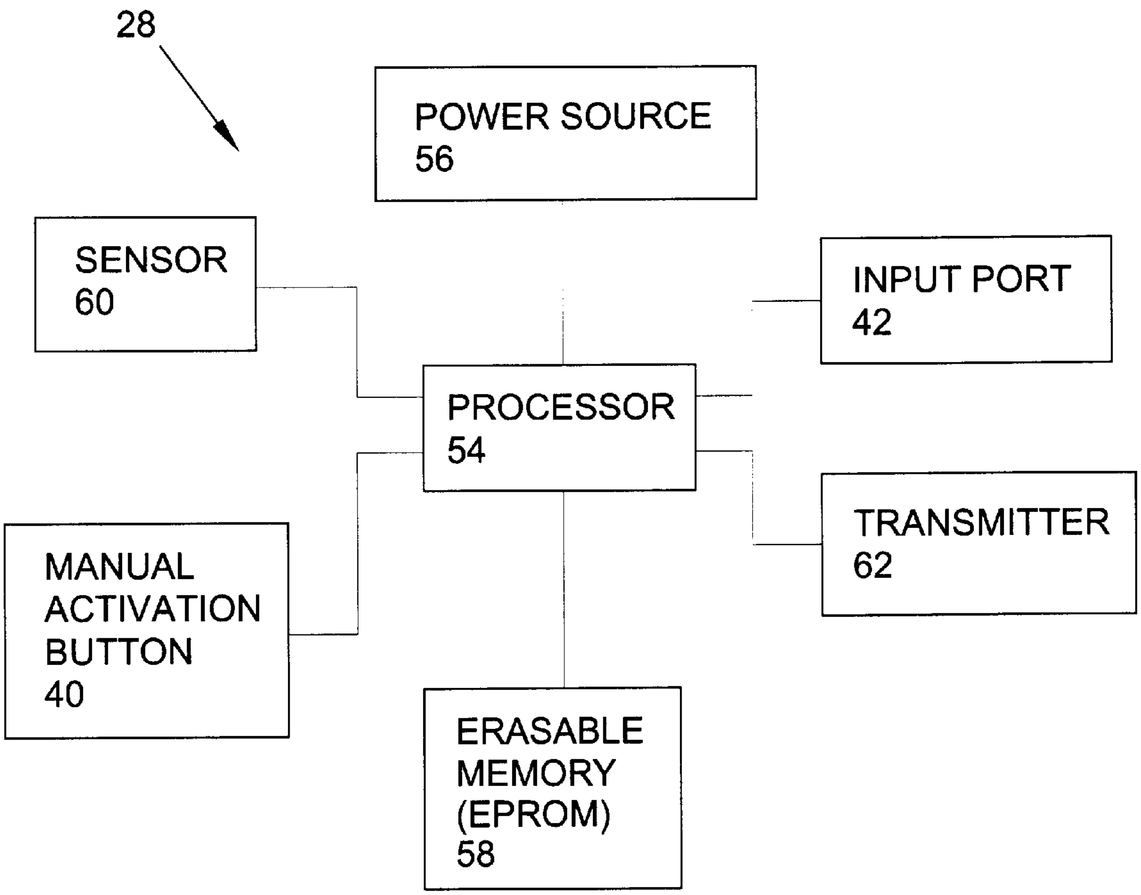
FIG. 5 is a block diagram illustrating the components of the information dispatch system of the present invention.

A block diagram of the information dispatch device 28 is illustrated in FIG. 5. The information dispatch device 28 includes a processor 54 for controlling operation of the information dispatch device 28. The processor 54 is connected to a power supply 56 for providing power to the information dispatch device 28. The power supply is preferably the vehicle battery. Alternatively, an external power source may also be used to supply the information dispatch device 28 with operating power. The input port 42 connects a data input terminal to the processor 54 for providing data regarding the vehicle and its load for storage in the memory 58. A sensor 60 is connected to the processor 54. The sensor 60 is able to sense for an impact on the vehicle, if the vehicle is on fire, if smoke is being produced by the vehicle, if the vehicle flips on its side, or any other hazardous emergency situation. The manual activation button 40 is also connected to the processor. A transmitter 62 is connected to the processor 54 for transmitting a signal including the data stored in the memory 58 to the GPS 26. Upon activation of the manual activation button 40 or the sensing of a emergency situation by the sensor 60, the processor 54 is activated to retrieve the data from the memory 58 and activates the transmitter 62 to transmit the data to the GPS 26. The GPS determines the location of the vehicle and transmits the location information along with the data transmitted by the information dispatch device 28 to the command control center 24. The Global Positioning System is capable of providing location information within 50 feet of actual location in all three dimensions anywhere on the earth's surface. Operation of the Global Positioning System will not be described since it is well known in the art and fully described in publications readily available to the public.

As previously noted, other broad coverage position transmission systems such as LORAN-C or the QASPR system offered by Qualcomm Incorporated may also be used as an alternative to the Global Positioning System. In that case the location of vehicle is calculated at a satellite link station 26 or at command control center 24 based upon signal timing measurements.

Figure 6:
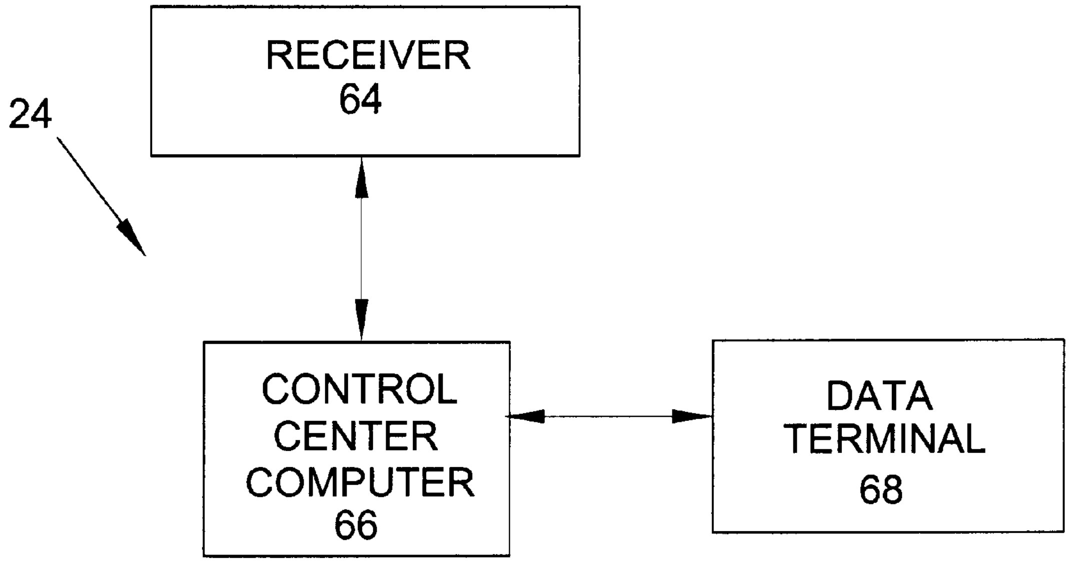
FIG. 6 is a block diagram illustrating the components of the information dispatch system of the present invention provided in the command control center.

A block diagram illustrating the components provided at the command control center 24 is provided in FIG. 6. As can be seen from this figure, the command control center 24 includes a receiver 64 tuned to receive signals from the GPS 26. The receiver 64 provides the received signals to a control center computer 66 which processes and analyzes the signals. The analyzed signals are then provided to a data terminal 68 for alerting an operator as to the emergency situation. The operator then is able to analyze the situation and contact the appropriate emergency personnel to handle the situation. The operator is also able to provide sufficient instructions and information to the emergency personnel so that the emergency may be handled quickly and safely.

The operation of the information dispatch system 20 will now be described with reference to the figures. In operation, the information dispatch device 28 is installed within a vehicle 22. The information dispatch device 28 is positioned on the dashboard 36 of the vehicle 22 so as to be readily accessible to the operator of the vehicle 22. The manual activation button 40 should be well within reach of the operator and thus may be readily activated should an emergency situation develop. The data input port 42 should also be readily accessible. The operator connects a data input terminal 44 to the information dispatch device 28 via the data input port 42. Once connected, the data input terminal 44 is utilized to input data to the processor 54 for storage in the memory 58. The data input using the data input terminal 44 includes registration information on the vehicle 22, information concerning the load being hauled by the vehicle 22, information on handling emergency situations concerning the vehicle 22 and procedures for handling the load being hauled thereby. Once the data is input, the vehicle is prepared for travel.

When enroute, the sensor 60 continually monitors the condition of the vehicle for emergency situations such as fire, the vehicle overturning or impact of the vehicle with another object. Should the sensor 60 sense one of these situations, the processor will be automatically activated to retrieve the data stored in the memory 58. The retrieved data is then provided to the transmitter 62 for transmission to a GPS 26. If the operator determines an emergency situation exists, the activation button 40 may be pressed to manually activate the processor 54 to retrieve the data from memory 58. This data is then supplied to the transmitter 62 for transmission to the GPS 26.

Upon receipt of the transmitted data signal, the GPS 26 determines the location of the vehicle 22. The GPS 26 then transmits a location signal along with the received data signal to a command control center 24. The signal transmitted by the GPS 26 is received by a receiver 64 at the command control center 24 and provided to a control center computer 66 for analysis. Upon analyzing the signal and determining the location of the vehicle 22 as well as the contents being hauled by the vehicle 22 and directions for handling emergency situations, a signal including this data is provided to a data terminal 68. An operator at the data terminal 68 is alerted as to the situation and contacts the appropriate emergency personnel for handling the situation. The operator also provides the emergency personnel with the needed information for locating the vehicle 22 and handling the emergency situation. The emergency personnel are then able to find the vehicle and take care of the emergency.

From the above description it can be seen that the information dispatch system 20 of the present invention is able to overcome the shortcomings of prior art devices by providing an information dispatch system 20 which is able to transmit information to a command control center regarding the type of carrier/vehicle involved in the accident and the location of the accident via the GPS system. The information dispatch system will also transmit information regarding the description of the hazardous material carried by the disabled carrier and the recommended procedure for safely rendering aid to the disabled carrier carrying the hazardous material. The information dispatch system automatically transmits the pre-programmed information to a central command control center via the GPS system upon detection of a hazardous situation thereby aiding the command control center in contacting the necessary emergency personnel at a location closest to the vehicle. The information dispatch system also includes an activation button for manually activating the transmitter to transmit the pre-programmed information to the command control center. Furthermore, the information dispatch system 20 of the present invention is simple and easy to use and economical in cost to manufacture.

While particular embodiments of the present invention have been shown and described, it should be clear that changes and modifications may be made to such embodiments without departing from the true scope and spirit of the invention. It is intended that the appended claims to cover all such changes and modifications.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An information dispatch system for notifying emergency personnel as to the location and contents of a vehicle, said information dispatch system comprising:

a) an information dispatch device positioned within the vehicle for storing data related to the vehicle, hazardous cargo being carried by the vehicle and instructions on handling emergency situations involving the cargo carried by the vehicle and means for transmitting said data during an emergency;

b) a command control center for receiving said data and contacting emergency personnel upon receipt of said data;

c) said information dispatch device further includes a manual activation button for manually activating said information dispatch device to transmit said data;

d) said information dispatch device further includes a sensor for detecting an emergency situation and automatically activating said information dispatch device to transmit said data to said command control center, said sensor being able to detect fire, smoke, turning over of the vehicle and impact on the vehicle; and e) said information dispatch device including an input port for inputting information identifying the vehicle, description of the load being carried and information on handling emergency situations concerning the vehicle and procedures for handling the load being hauled.

2. A method of alerting emergency personnel to an emergency situation involving a vehicle, said method comprising the steps of:

a) programming an information dispatch device installed within the vehicle with data identifying the vehicle, hazardous cargo being transported by the vehicle and instructions on handling emergency situations involving the cargo being hauled;

b) manually activating the information dispatch device to transmit said data;

c) sensing an emergency situation including the presence of fire, smoke, turning over of the vehicle and impact on the vehicle;

d) automatically transmitting said data upon the occurrence of said emergency situation;

e) receiving said data at a command control center; and f) alerting the appropriate emergency personnel as to the hazardous cargo carried by the vehicle and care instructions related to handling the hazardous cargo in order to assist in handling the emergency situation.

* * * * *